United States Patent
Chang et al.

(10) Patent No.: US 9,264,194 B2
(45) Date of Patent: Feb. 16, 2016

(54) PREAMBLE GENERATION METHOD AND APPARATUS OF STATION, AND DATA FRAME GENERATION METHOD

(75) Inventors: Kapseok Chang, Daejeon (KR); Wooyong Lee, Daejeon (KR); Hyun-Kyu Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 422 days.

(21) Appl. No.: 12/862,169

(22) Filed: Aug. 24, 2010

(65) Prior Publication Data

US 2011/0051822 A1 Mar. 3, 2011

(30) Foreign Application Priority Data

Aug. 25, 2009 (KR) ........................ 10-2009-0078944

(51) Int. Cl.
*H04J 11/00* (2006.01)
*H04L 5/00* (2006.01)
*H04L 25/02* (2006.01)

(52) U.S. Cl.
CPC .......... *H04L 5/0048* (2013.01); *H04L 25/0226* (2013.01); *H04L 5/0007* (2013.01)

(58) Field of Classification Search
CPC .................................. H04L 5/0007
USPC ........................................... 370/208
See application file for complete search history.

(56) References Cited

U.S. PATENT DOCUMENTS

| | | | |
|---|---|---|---|
| 5,909,462 A * | 6/1999 | Kamerman et al. .......... 375/147 |
| 2004/0022174 A1* | 2/2004 | Li et al. ..................... 370/203 |
| 2005/0249298 A1* | 11/2005 | Kim et al. ................... 375/260 |
| 2006/0104380 A1 | 5/2006 | Magee et al. |
| 2007/0248175 A1* | 10/2007 | Bruninghaus et al. ....... 375/260 |
| 2008/0175332 A1* | 7/2008 | Coon ......................... 375/267 |
| 2010/0027483 A1* | 2/2010 | Ofuji et al. ................. 370/329 |
| 2010/0111225 A1* | 5/2010 | Kroeger .................... 375/298 |
| 2010/0165954 A1* | 7/2010 | Lin et al. .................... 370/335 |
| 2010/0290425 A1* | 11/2010 | Hadad ....................... 370/330 |

FOREIGN PATENT DOCUMENTS

| | | |
|---|---|---|
| JP | 2008-160845 A | 7/2008 |
| KR | 1020060106602 A | 10/2006 |

OTHER PUBLICATIONS

Chang et al; Robust replica correlation-based symbol synchronization in OFDM systems; Aug. 14, 2008; Electronics Letters; vol. 44; 1-2.*

* cited by examiner

*Primary Examiner* — Christopher R Crompton

(57) ABSTRACT

A preamble generation method of a station includes: generating a base sequence for channel estimation; generating an antenna channel estimation sequence for at least one or more antennas of the station; generating a preamble by allocating at least one or more modified sequences to frequency domains for at least one or time periods. The modified sequences are generated by using the base sequence, the antenna channel estimation sequence, and a control sequence for estimating at least one or more channels.

8 Claims, 6 Drawing Sheets

PREAMBLE GENERATION METHOD AND APPARATUS OF STATION, AND DATA FRAME GENERATION METHOD

CROSS-REFERENCE(S) TO RELATED APPLICATIONS

The present application claims priority of Korean Patent Application No. 10-2009-0078944, filed on Aug. 25, 2009, which is incorporated herein by reference in its entirety.

BACKGROUND OF THE INVENTION

1. Field of the Invention

Exemplary embodiments of the present invention relate to a preamble generation method and apparatus of a station; and, more particularly; to a preamble generation method and apparatus of a station, which performs channel estimation.

2. Description of Related Art

Recently, in order to increase system frequency efficiency in a wireless communication system, research has been conducted on a cooperative communication method using relay. In particular, attempts to utilize the cooperative communication method in IEEE 802.11ad or the like using a frequency band of 60 GHz are being actively made. In the cooperative communication method using relay, a source node and a relay node cooperatively transmit data to a destination node. Therefore, as a path loss decreases, it is possible to perform high-speed data communication. Furthermore, since a signal is transmitted to even a destination node remote from the source node, it is possible to expand a service area.

Such a cooperative communication system has an advantage in that it may support a large number of terminals through fewer resources. However, one terminal needs to discriminate channel-state information on a plurality of terminals at the same time. That is, a channel-state estimation sequence for discriminating the plurality of terminals is needed. However, the conventional wireless communication system, that is, the IEEE 802.11 wireless local area network (WALN) system, which is a near field communication system, does not include a standard for the structure of a preamble for discriminating a plurality of terminals to estimate channel states.

Since the plurality of terminals should be discriminated, the channel-state estimation sequence for discriminating the plurality of terminals needs to be increased. However, the conventional wireless communication system, that is, the IEEE 802.11 WALN system does not allow a long preamble structure for discriminating a plurality of terminals to estimate channel states at the same time.

SUMMARY OF THE INVENTION

An embodiment of the present invention is directed to a preamble generation method and apparatus of a station, which performs channel estimation effectively.

Another embodiment of the present invention is directed to a preamble generation method and apparatus for providing a preamble capable of discriminating a plurality of stations and minimizing the influence caused by an increase or decrease in the number of communicating stations.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a preamble generation method of a station includes: generating a base sequence for channel estimation; generating an antenna channel estimation sequence for at least one or more antennas of the station; generating a preamble by allocating at least one or more modified sequences to frequency domains for at least one or time periods. The modified sequences are generated by using the base sequence, the antenna channel estimation sequence, and a control sequence for estimating at least one or more channels.

In accordance with another embodiment of the present invention, a preamble generation method of a station includes: using a base sequence for channel estimation to generate a modified sequence; generating an antenna channel estimation sequence for at least one or more antennas of the station; generating a preamble by allocating the base sequence, the modified sequence, and the antenna channel estimation sequence to frequency domains for at least one or time periods. The modified sequence includes a complex conjugate sequence of the base sequence or a sequence having a different sign from the base sequence.

In accordance with another embodiment of the present invention, a preamble generation apparatus of a station includes: a first sequence generation unit configured to generate a base sequence for channel estimation; a second sequence generation unit configured to generate an antenna channel estimation sequence for at least one or more antennas of the station; and a preamble generation unit configured to generate a preamble by allocating at least one or more modified sequences to frequency domains for at least one or more time periods. The modified sequences are generated by the base sequence, the antenna channel estimation sequence, and a control sequence for estimating at least one or more channels.

In accordance with another embodiment of the present invention, a preamble generation apparatus of a station includes: a first sequence generation unit configured to use a base sequence for channel estimation to generate a modified sequence; a second sequence generation unit configured to an antenna channel estimation sequence for at least one or more antennas of the station; a preamble generation unit configured to generate a preamble by allocating the base sequence, the modified sequence, and the antenna channel estimation sequence to frequency domains for at least one or time periods. The modified sequence includes a complex conjugate sequence of the base sequence or a sequence having a different sign from the base sequence.

In accordance with another embodiment of the present invention, a frame generation method for wireless communication includes: using bit data mapped on complex coordinates to generate modified data which is a complex conjugate form of the bit data; and generating a data frame by allocating the bit data to one half of OFDM subcarriers depending on preset frequency resources and allocating the modified data to the other half of the OFDM subcarriers during the same time period.

DESCRIPTION OF SPECIFIC EMBODIMENTS

Figure 1:
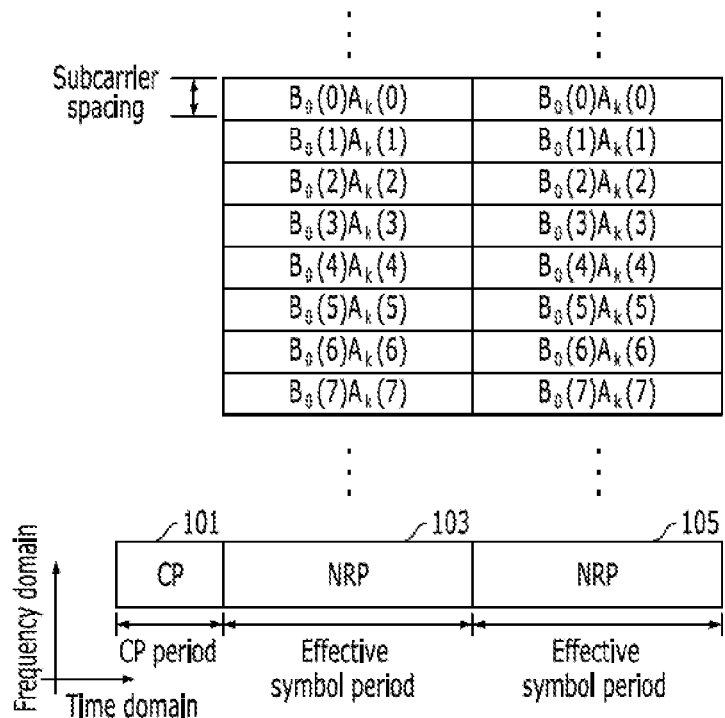
FIG. 1 is a diagram explaining the structure of a preamble in the IEEE 802.11 wireless communication system.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram explaining the structure of a preamble in the IEEE 802.11 wireless communication system.

Referring to FIG. 1, a preamble for channel estimation of IEEE 802.11 includes the same two orthogonal frequency division multiplexing (OFDM) non-repetition pattern (NRP) sequences 103 and 105 and one cyclic prefix (CP) 101 having a length two times larger than a general CP. The NRP sequences 103 and 105 are allocated to effective symbol periods of a time domain, and the CP 101 is allocated to a CP period.

In FIG. 1, $B_0(m)$ represents a base sequence for channel estimation which is allocated to a frequency domain of the preamble for channel estimation, where m is an integer equal to or larger than zero (m=0, 1, and $A_k(m)$ represents an antenna channel estimation sequence for channel estimation in each transmission antenna of a station using the base sequence, where k and m are an integer equal to or larger than zero (k=0, 1, ..., P−1 and m=0, 1, 2 ...). The antenna channel estimation sequence is multiplied by the base sequence, and then allocated to the frequency domain of the preamble. Here, k represents an antenna index, P represents the maximum number of transmission antennas, and m represents an element of the sequence.

For example, when the station has one antenna, $A_k(m)$ may be 1 ($A_k(m)=1$) for all the elements m. That is, only the base sequence may be allocated to the preamble. Furthermore, $B_0(0)$ represents a first element of the base sequence.

The preamble described with reference to FIG. 1 includes the channel-estimation sequences for a plurality of antennas, but does not include channel-estimation sequences for a plurality of stations. However, the channel-estimation sequences for the plurality of stations may be allocated to the preamble, in order to improve frequency efficiency through fewer resources.

Hereafter, a preamble generation method and apparatus capable of performing channel estimation for a plurality of stations at the same time will be described. When a station allocates a channel-estimation sequence including a binary sequence or complex sequence to a specific frequency domain of a specific OFDM symbol by using the same frequency/time resources or limited frequency/time resources, a modified sequence expanded from one base sequence is used. The preamble generation method and apparatus modifies the base sequence and generates the modified sequence, in order to facilitate the expansion from the base sequence.

Furthermore, a wireless communication system based on the OFDM scheme will be described as an embodiment of the present invention. The station which will be described below may include a source node, a relay node, and a destination node. Furthermore, the station may include a terminal and an access point (AP).

Figure 2:
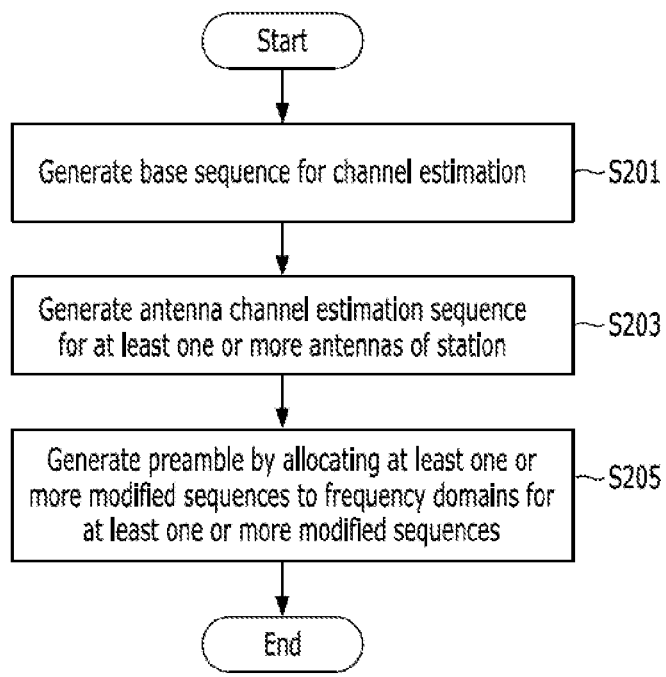
FIGS. 2 and 3 are diagrams explaining a preamble generation method and apparatus in accordance with an embodiment of the present invention.
Figure 3:
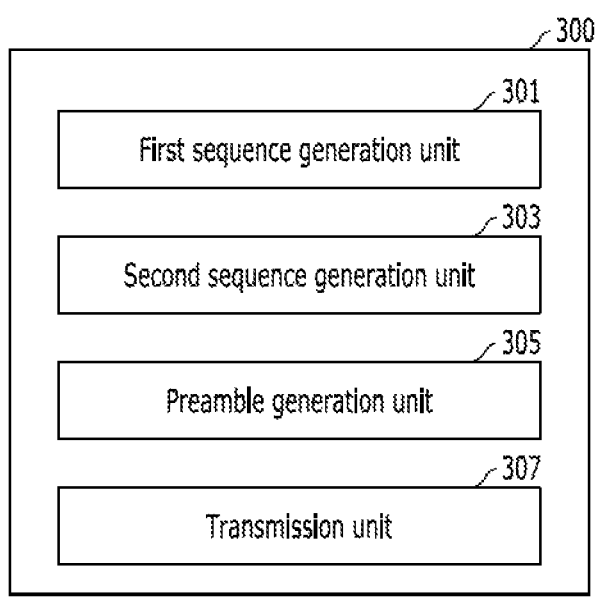

FIGS. 2 and 3 are diagrams explaining a preamble generation method and apparatus in accordance with an embodiment of the present invention.

Referring to FIG. 2, the preamble generation method for wireless communication in accordance with the embodiment of the present invention is performed through steps S201, S203, and S205. Referring to FIG. 3, the preamble generation apparatus 300 for wireless communication in accordance with the embodiment of the present invention includes a first sequence generation unit 301, a second sequence generation unit 303, and a preamble generation unit 305.

At the step S201, the preamble generation apparatus 300 generates a base sequence for channel estimation. At the step S203, the preamble generation apparatus 300 generates an antenna channel estimation sequence for at least one or more antennas of a station. At the step S205, the preamble generation apparatus 300 generates a preamble by allocating at least one or more modified sequences to a frequency domain for at least one or more time periods. The modified sequences may be allocated to the NRP sequence domains described with reference to FIG. 1, and may be allocated to time periods corresponding to the number of stations requiring the channel estimation.

Here, the modified sequences are sequences generated by using the base sequence, the antenna channel estimation sequence, and a control sequence for estimating at least one or more channels, and may be generated by the preamble generation apparatus 300. For example, when a preamble for performing channel estimation for four terminals is required, the preamble generation apparatus 300 may generate a preamble in which four modified sequences are allocated to the respective frequency domains of four time periods.

The control sequence is a sequence for estimating at least one or more channels, that is, a sequence for performing channel estimation for at least one or more stations. The control sequence may include a codeword having a predetermined length or a scramble sequence for recognizing the identifier (ID) of a station, that is, an access point or a control terminal of cooperative communication. The modified sequence will be described in more detail with reference to FIGS. 4 to 6.

Meanwhile, the above-described steps S201, S203, and S205 may be performed by the first sequence generation unit 301, the second sequence generation unit 303, and the preamble generation unit 305 of FIG. 3. That is, the first sequence generation unit 301 is configured to generate a base sequence for channel estimation. The second sequence generation unit 303 is configured to generate an antenna channel estimation sequence for at least one or more antennas of the station. The preamble generation unit 305 generates a preamble by allocating at least one or more modified sequences to frequency domains for at least one or more time periods. The preamble generated by the preamble generation unit 305 may be transmitted to a reception station through a transmission unit 307.

In accordance with the embodiment of the present invention, a preamble for performing channel estimation for a plurality of stations may be generated, and the number of stations performing cooperative communication may be increased. Furthermore, the modified sequences are generated on the basis of the base sequence for channel estimation, and then used to generate the preamble. Therefore, it is possible to minimize the influence caused by the increase or decrease in the number of stations participating in the cooperative communication.

Figure 4:
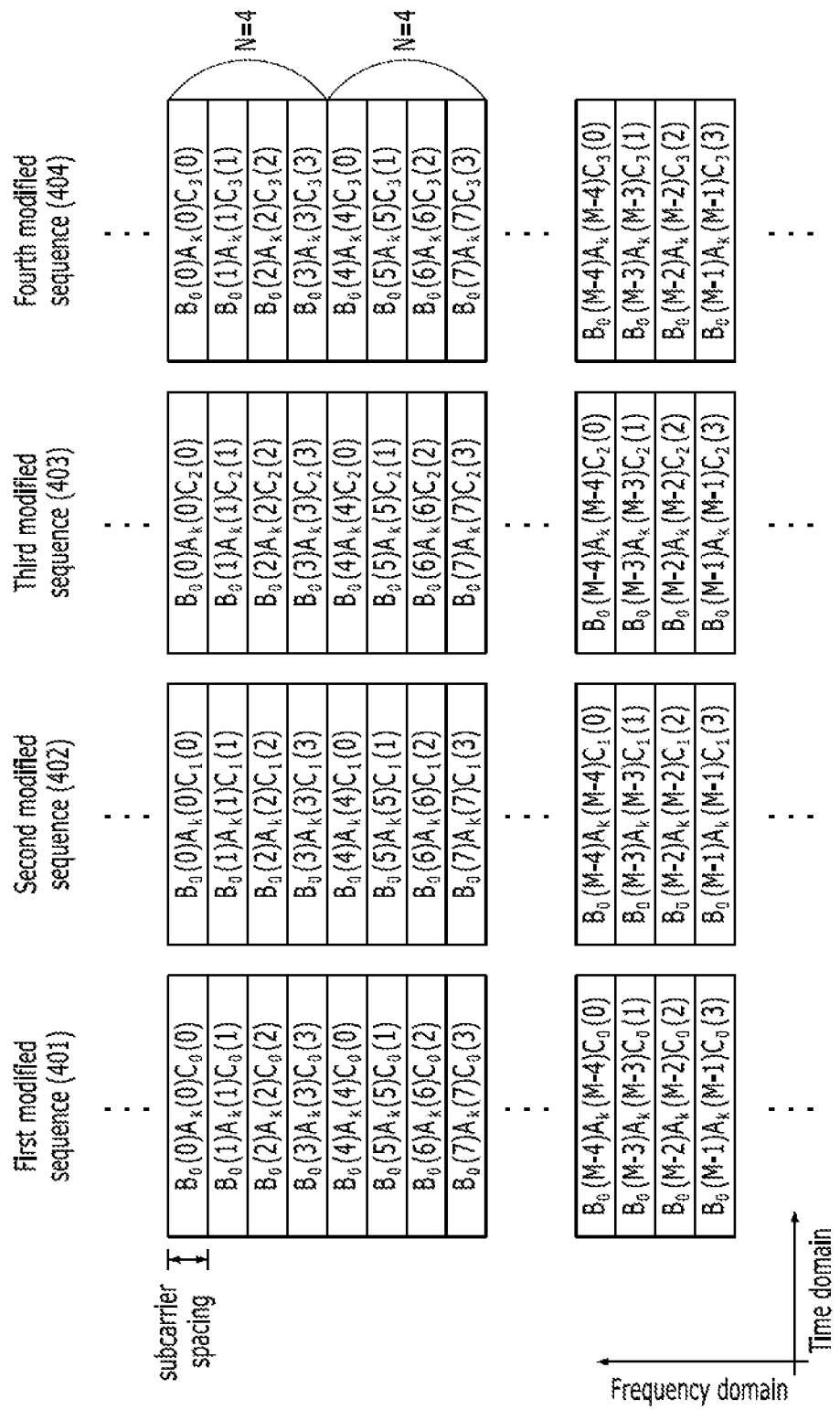
FIG. 4 is a diagram explaining the structure of a preamble in accordance with an embodiment of the present invention.
Figure 5:
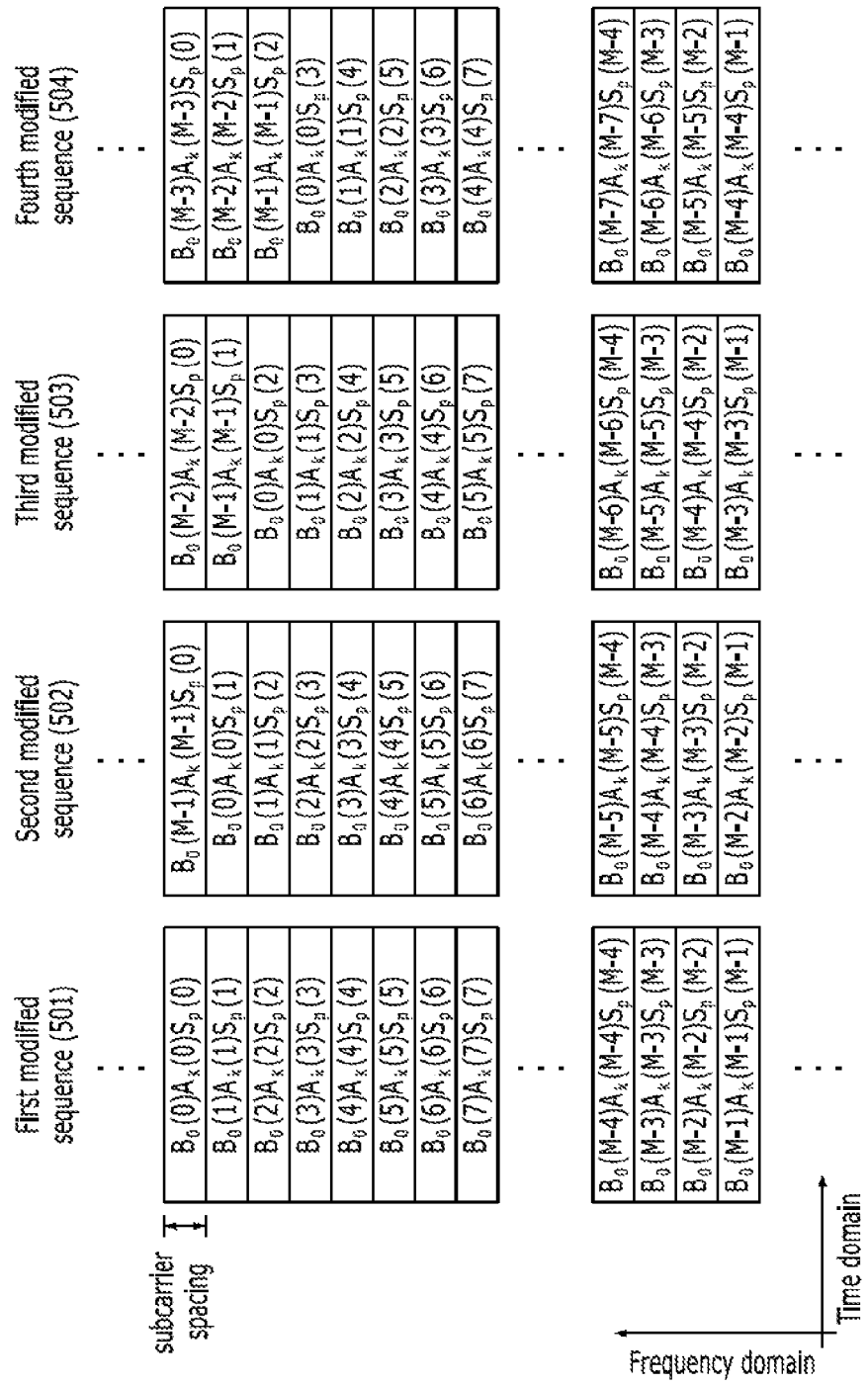
FIGS. 5 and 6 are diagrams explaining the structure of a preamble in accordance with another embodiment of the present invention.
Figure 6:
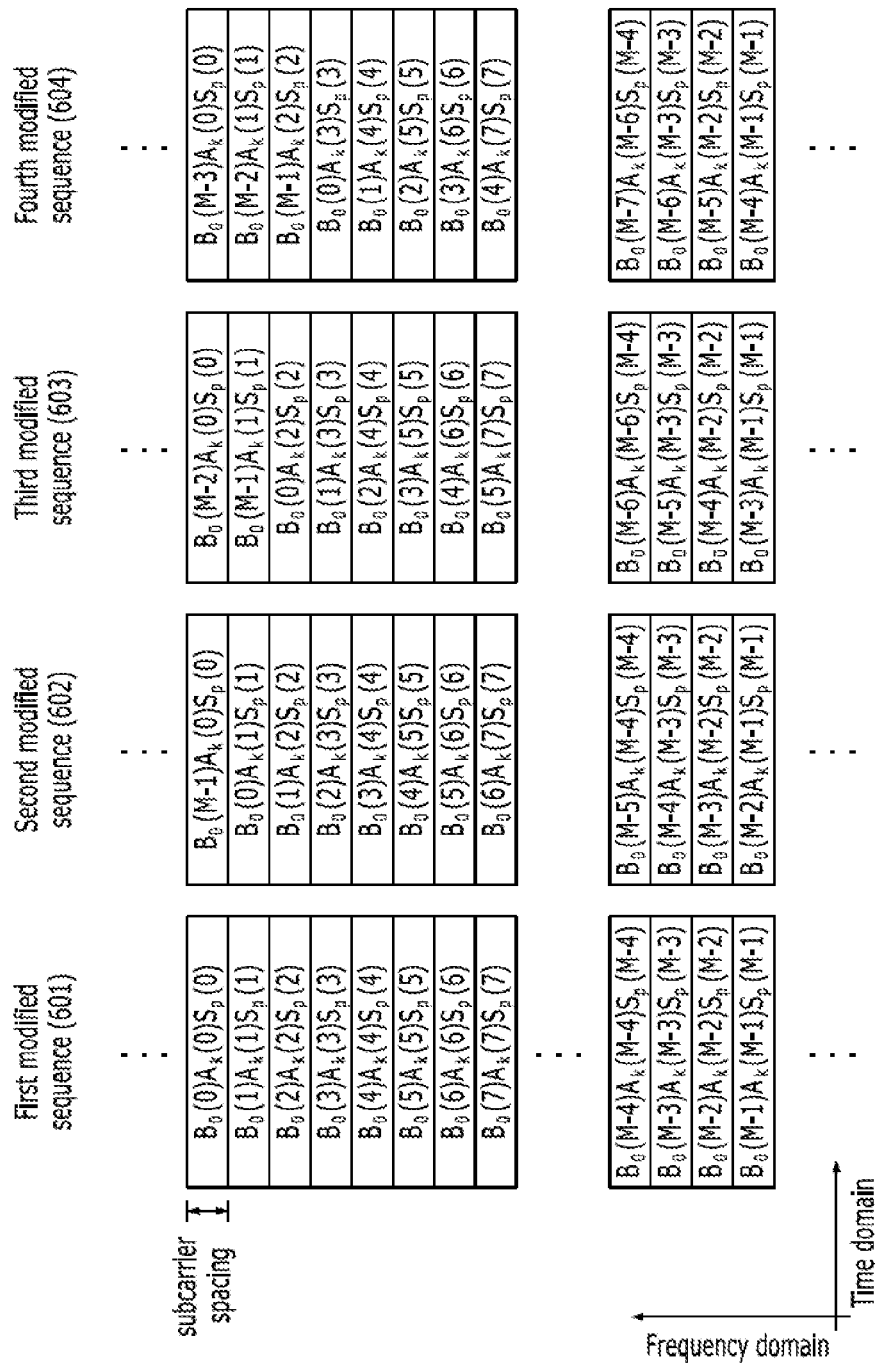

Hereafter, a preamble including modified sequences in accordance with another embodiment of the present invention will be described in detail. Referring to FIGS. 4 to 6, a preamble for performing channel estimation for four stations will be described as an example. FIG. 4 shows a case in which the control sequence is a codeword having a preset length, and FIGS. 5 and 6 show a case in which the control sequence is a scramble sequence.

FIG. 4 is a diagram explaining the structure of the preamble in accordance with the embodiment of the present invention.

Referring to FIG. 4, the preamble in accordance with the embodiment of the present invention includes first to fourth modified sequences 401 to 404 in frequency domains for four time periods.

In FIG. 4, $C_i$ represents a codeword, and i represents the index of the codeword. When a Hadamard codeword having a length of 4 (N=4) is used, the codeword $C_i$ may include $C_0=[1,1,1,1]$, $C_1=[1,-1,1,-1]$, $C_2=[1,-1,-1,1]$, and $C_3=[1,1,-1,-1]$. The number of modified sequences may be decided according to the length of the codeword, and the respective codewords $C_0$, $C_1$, $C_2$, and $C_3$ are used for generating the first to fourth modified sequences 401 to 404. Since the codewords $C_0$, $C_2$, $C_2$, and $C_3$ have four elements, that is, the codeword length is 4 (N=4), the respective elements of the first to fourth modified sequences 401 to 404 may be grouped by four elements.

Referring to FIG. 4, each of the first to fourth modified sequences 401 to 404 includes a value obtained by multiplying an element of the base sequence, an element of the antenna channel estimation sequence, and an element of the control sequence as an element. That is, the first to fourth modified sequences 401 to 404 are allocated to different time periods, and values obtained by multiplying elements of the base sequence $B_0(m)$, elements of the antenna channel estimation sequence $A_k(m)$, and elements of the codeword ($C_i$), respectively, are allocated to subcarriers of different time periods.

More specifically, in order to generate the first modified sequence 401, the base sequence and the antenna channel estimation sequence are allocated to the frequency domain. Then, four consecutive sequence elements are periodically grouped, and the elements of the codeword $C_0$ are sequentially multiplied by four elements of each group to generate the first modified sequence 401. The second to fourth modified sequences 402 to 404 may be generated by the above-described method.

The polarity of the modified sequence, that is, the sign of an element of the modified sequence is decided according to the sign of the codeword $C_i$. That is, the sign of one or both of a real number component and an imaginary number component in the element of the modified sequence may be changed according to the sign of the codeword $C_i$. For example, when the corresponding element of the codeword $C_i$ has a value of −1, the polarity of the element of the first modified sequence 401 allocated to the corresponding subcarrier is changed. The sign of one or both of a real number component and an imaginary number component in an element of the modified sequence may be changed depending on the properties of the base sequence, the antenna channel estimation sequence, and the codeword.

FIGS. 5 and 6 are diagrams explaining the structure of a preamble in accordance with another embodiment of the present invention.

The preamble generation method in accordance with the embodiment of the present invention cyclic-shifts at least one or more of a base sequence, an antenna channel estimation sequence, and a control sequence, and allocates the shifted sequence to the frequency domain. FIGS. 5 and 6 show a case in which the base sequence and the antenna channel estimation sequence are cyclic-shifted.

In FIG. 5, the base sequence $B_0(m)$ and the antenna channel estimation sequence $A_k(m)$ are cyclic-shifted and allocated to first to fourth modified sequences 510 to 504. In FIG. 6, only the base sequence $B_0(m)$ is cyclic-shifted and allocated to the first to fourth modified sequence 601 to 604. As described with reference to FIG. 4, the first to fourth modified sequences are allocated to different time domains. In FIGS. 5 and 6, a scramble sequence is used as the control sequence, and the base sequence and the antenna channel estimation sequence are cyclic-shifted, unlike in FIG. 4.

In FIGS. 5 and 6, $S_p(m)$ represents the scramble sequence. As described above, the scramble sequence is a sequence for recognizing the ID of an access point or a control terminal of cooperative communication, and is used to equalize the interference caused by terminals belonging to another access point and expand the number of discriminable terminals. For example, although the indexes of base sequences are all 0, it may be considered that the terminals are discriminable from each other, when the indexes p of scramble sequences are different from each other.

In FIGS. 5 and 6, the sequences are cyclic-shifted by one subcarrier. However, the embodiment of the present invention is not limited thereto. Furthermore, the control sequence, that is, the scramble sequence may be cyclic-shifted, or all of the base sequence, the antenna channel estimation sequence, and the control sequence may be cyclic-shifted.

Figure 7:
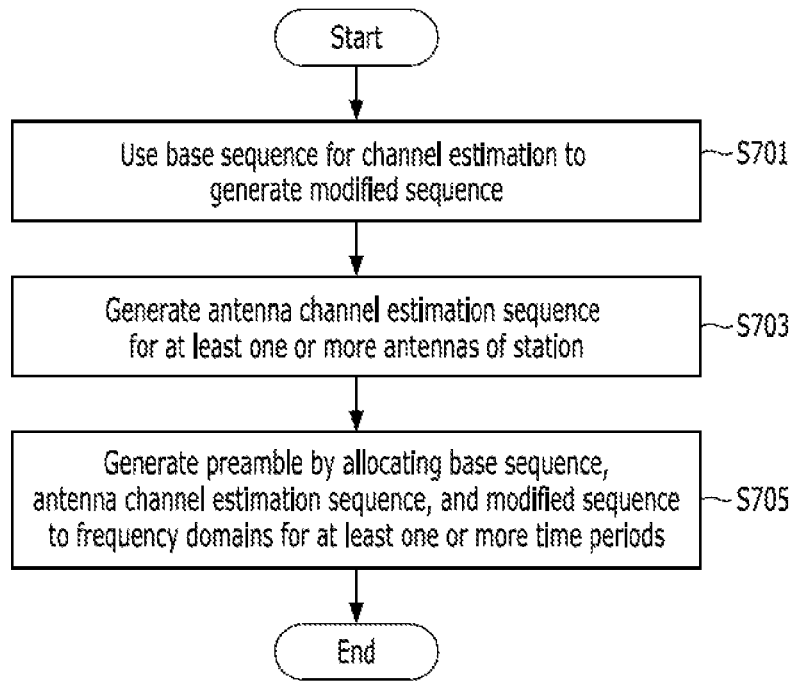
FIG. 7 is a diagram explaining a preamble generation method in accordance with another embodiment of the present invention.

FIG. 7 is a diagram explaining a preamble generation method in accordance with another embodiment of the present invention.

Referring to FIG. 7, the preamble generation method in accordance with the embodiment of the present invention starts from step S701.

At the step S701, a station uses a base sequence for channel estimation to generate a modified sequence. At step S703, the station generates an antenna channel estimation sequence for at least one or more antennas of the station. At the step S703, the station generates a preamble by allocating the base sequence, the modified sequence, and the antenna channel estimation sequence to frequency domains for at least one or more time periods.

The modified sequence includes a complex conjugate sequence of the base sequence or a sequence having a different sign from the base sequence. That is, the preamble generation method in accordance with the embodiment of the present invention generates a preamble by allocating the base sequence, the modified sequence, and the antenna channel estimation sequence to a frequency domain, while one base sequence and one antenna channel estimation sequence are allocated to the frequency domain to generate the preamble in FIG. 1. As the base sequence and the modified sequence of the base sequence are allocated to the frequency domain of the same time period, stronger performance may be achieved in frequency offset.

At the step S703, the station may generate a preamble by allocating the control sequence described with reference to FIGS. 2 to 6 as well as the base sequence, the antenna channel estimation sequence, and the modified sequence. The operation for additionally allocating the modified sequence to the frequency domain will be described in more detail with reference to FIG. 8.

The preamble generation method described with reference to FIG. 7 may be easily understood from an apparatus point of view. That is, the respective steps composing the preamble generation method of FIG. 7 may be easily understood from the apparatus point of view, and may be considered to be components included in a preamble generation apparatus.

Figure 8:
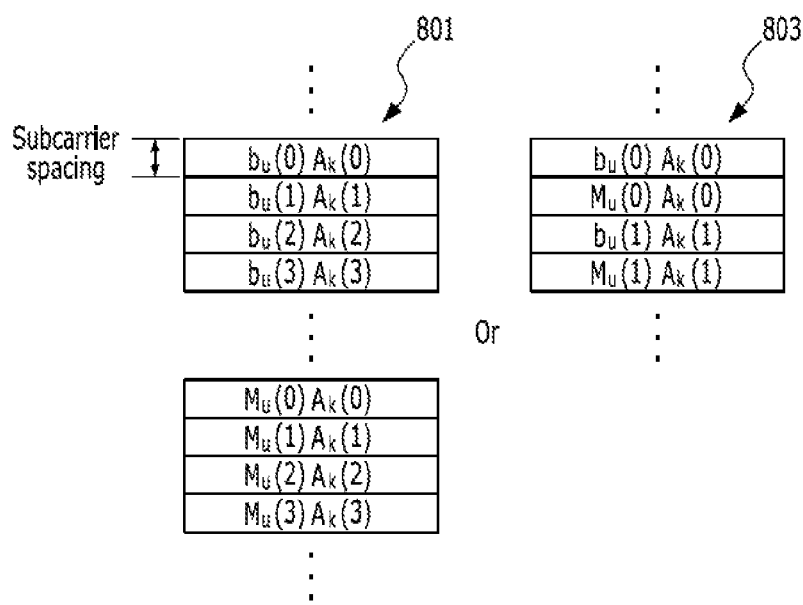
FIG. 8 is a diagram explaining an operation for allocating a modified sequence to a frequency domain in detail.

FIG. 8 is a diagram explaining the operation for allocating the modified sequence to the frequency domain in more detail.

In FIG. 8, $b_u(m)$ represents a base sequence for channel estimation, $M_u(m)$ represents a modified sequence which may be $-b_u(m)$ or $b^*_u(m)$, where * means that the sign of an imaginary number component of a complex conjugate, that is, a complex sequence element is changed, and u represents the index of a sequence. And the modified sequence may be the same with the base sequence.

Referring to FIG. 8, a first element value obtained by multiplying an element of the base sequence and an element of an antenna channel estimation sequence and a second element value obtained by multiplying an element of the modified sequence and the element of the antenna channel estimation sequence are allocated to subcarriers. More specifically, the base sequence and the modified sequence may be allocated locally or in a distributed manner.

In FIG. 8, 801 indicates that the elements of the base sequence and the elements of the modified sequence are sequentially allocated to subcarriers, that is, the base sequence and the modified sequence are allocated locally. Furthermore, 803 indicates that the element of the base sequence and the element of the modified sequence are alternately allocated to subcarriers, that is, the base sequence and the modified sequence are allocated in a distributed manner. The base sequence and the modified sequence may be allocated to all available subcarriers depending on preset frequency resources.

As described above, the elements of the control sequence and the elements of the base sequence and the element of the modified sequence may be simultaneously allocated to subcarriers to generate the preamble.

The above-described preamble generation method may also be applied to a case in which a data frame is to be generated. That is, it is possible to a data frame in which bit data is allocated to the frequency domain. This operation will be described below in detail.

A station performing wireless communication uses bit data to generate modified data which is a complex conjugate form of the bit data. The station generates a data frame by allocating the bit data and the modified data to the frequency domain of the same time period. Then, the station transmits the generated data frame to a reception station.

At this time, the station may generate the data frame by alternately or sequentially allocating the bit data and the modified data to subcarriers, as described with reference to FIG. 8. The antenna channel estimation sequence is not allocated, and the bit data and the modified data are alternately or sequentially allocated to subcarriers. If the bit data and the modified data are sequentially allocated to subcarriers, one half and the other half of the entire subcarriers depending on the preset frequency resources may be allocated to the bit data and the modified data, respectively.

For example, when the number of entire available subcarriers is eight, the bit data may be allocated to the first to fourth subcarriers, and the modified data may be allocated to the fifth to eighth subcarriers. That is, the bit data may be allocated to one half of OFDM subcarriers depending on preset frequency resources and the modified data may be allocated to the other half of OFDM subcarriers to generate the data frame. Here, the bit data may include a plurality of symbols mapped on the complex coordinates, that is, the above-described complex sequence data. The modified data is a complex conjugate form of the bit data.

Meanwhile, the reception station receiving the above-described preamble performs channel estimation for at least one or more transmission stations by using the received preamble. Furthermore, the reception station receiving the above-described preamble decodes the data frame. That is, the reception station may receive the preamble or data frame from the transmission station and perform channel estimation or data decoding by using the received preamble or data frame. The preamble and data frame reception method in accordance with the embodiment of the present invention will be easily understood from an apparatus point of view. That is, the respective steps composing the preamble and data frame reception method may be easily understood from the apparatus point of view, and considered to be components included in the station.

In accordance with the embodiments of the present invention, the preamble capable of estimating channels for a plurality of stations may be provided to increase the number of stations performing cooperative communication.

Furthermore, the modified sequence is generated on the basis of the base sequence for channel estimation, and used to generate the preamble. Therefore, it is possible to minimize the influence caused by the increase or decrease in the number of stations participating in the cooperative communication.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. A transmission apparatus, comprising:
   a first sequence generation unit configured to allocate a first sequence including first symbols into first sub-carriers;
   a second sequence generation unit configured to allocate a second sequence including second symbols into second sub-carriers; and
   a transmitting unit configured to transmit the first sequence allocated to the first sub-carriers and the second sequence allocated to the second sub-carriers,
   wherein the second sequence is generated for channel estimation of a plurality of stations, and allocated to a frequency domain of a time period for each of the plurality of stations,
   wherein the first sub-carriers are one of upper sub-carriers and lower sub-carriers, and the second sub-carriers are the other of the upper sub-carriers and the lower sub-carriers,
   wherein the number of time periods corresponds to the number of the plurality of stations, and wherein the second symbols are derived by applying complex-conjugation to each of the first symbols.

2. The transmission apparatus of claim 1, wherein the first sub-carriers are one half of all sub-carriers, and the second sub-carriers are the other half of the sub-carriers.

3. A transmission apparatus, comprising:
a first sequence generation unit configured to allocate a first sequence including first symbols into first sub-carriers;
a second sequence generation unit configured to allocate a second sequence including second symbols into second sub-carriers; and
a transmitting unit configured to transmit the first sequence allocated to the first sub-carriers and the second sequence allocated to the second sub-carriers,
wherein the second sequence is generated for channel estimation of a plurality of stations, and allocated to a frequency domain of a time period for each of the plurality of stations,
wherein the first sub-carriers are one of upper sub-carriers and lower sub-carriers, and the second sub-carriers are the other of the upper sub-carriers and the lower sub-carriers,
wherein the number of time periods corresponds to the number of the plurality of stations, and
wherein the second symbols are derived by applying negative 1 or positive 1 to each of the first symbols.

4. A transmission apparatus, comprising:
a first sequence generation unit configured to allocate a first sequence including first symbols into first sub-carriers;
a second sequence generation unit configured to allocate a second sequence including second symbols into second sub-carriers; and
a transmitting unit configured to transmit the first sequence allocated to the first sub-carriers and the second sequence allocated to the second sub-carriers,
wherein the second sequence is generated for channel estimation of a plurality of stations, and allocated to a frequency domain of a time period for each of the plurality of stations,
wherein the first sub-carriers are one of upper sub-carriers and lower sub-carriers, and the second sub-carriers are the other of the upper sub-carriers and the lower sub-carriers,
wherein the number of time periods corresponds to the number of the plurality of stations, and
wherein the second symbols are derived by applying complex-conjugation and negative 1 to each of the first symbols.

5. A transmission method, comprising:
allocating a first sequence including first symbols into first sub-carriers;
allocating a second sequence including second symbols into second sub-carriers; and
transmitting the first sequence allocated to the first sub-carriers and the second sequence allocated to the second sub-carriers,
wherein the second sequence is generated for channel estimation of a plurality of stations, and allocated to a frequency domain of a time period for each of the plurality of stations,
wherein the first sub-carriers are one of upper sub-carriers and lower sub-carriers, and the second sub-carriers are the other of the upper sub-carriers and the lower sub-carriers,
wherein the number of time periods corresponds to the number of the plurality of stations, and
wherein the second symbols are derived by applying complex-conjugation to each of the first symbols.

6. The transmission method of claim 5, wherein the first sub-carriers are one half of all sub-carriers, and the second sub-carriers are the other half of the sub-carriers.

7. A transmission method, comprising:
allocating a first sequence including first symbols into first sub-carriers;
allocating a second sequence including second symbols into second sub-carriers; and
transmitting the first sequence allocated to the first sub-carriers and the second sequence allocated to the second sub-carriers,
wherein the second sequence is generated for channel estimation of a plurality of stations, and allocated to a frequency domain of a time period for each of the plurality of stations,
wherein the first sub-carriers are one of upper sub-carriers and lower sub-carriers, and the second sub-carriers are the other of the upper sub-carriers and the lower sub-carriers,
wherein the number of time periods corresponds to the number of the plurality of stations, and
wherein the second symbols are derived by applying negative 1 or positive 1 to each of the first symbols.

8. A transmission method, comprising:
allocating a first sequence including first symbols into first sub-carriers;
allocating a second sequence including second symbols into second sub-carriers; and
transmitting the first sequence allocated to the first sub-carriers and the second sequence allocated to the second sub-carriers,
wherein the second sequence is generated for channel estimation of a plurality of stations, and allocated to a frequency domain of a time period for each of the plurality of stations,
wherein the first sub-carriers are one of upper sub-carriers and lower sub-carriers, and the second sub-carriers are the other of the upper sub-carriers and the lower sub-carriers,
wherein the number of time periods corresponds to the number of the plurality of stations, and
wherein the second symbols are derived by applying complex-conjugation and negative 1 to each of the first symbols.

* * * * *